(12) United States Patent
Matsunaga

(10) Patent No.: US 9,131,186 B2
(45) Date of Patent: Sep. 8, 2015

(54) IMAGE FORMATION APPARATUS

(71) Applicant: Oki Data Corporation, Tokyo (JP)

(72) Inventor: Masayuki Matsunaga, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/495,943

(22) Filed: Sep. 25, 2014

(65) Prior Publication Data

US 2015/0092220 A1    Apr. 2, 2015

(30) Foreign Application Priority Data

Sep. 27, 2013    (JP) .................................. 2013-201010

(51) Int. Cl.
*H04N 1/44* (2006.01)
*G06F 21/31* (2013.01)
*G06K 15/00* (2006.01)
*H04N 1/00* (2006.01)

(52) U.S. Cl.
CPC .............. *H04N 1/4433* (2013.01); *G06F 21/31* (2013.01); *G06K 15/4095* (2013.01); *H04N 1/00055* (2013.01); *H04N 1/00689* (2013.01); *H04N 2201/0094* (2013.01); *H04N 2201/3205* (2013.01)

(58) Field of Classification Search
CPC ................ H04N 2201/3205; H04N 2201/0094
USPC .......................................................... 358/1.13
See application file for complete search history.

(56) References Cited

U.S. PATENT DOCUMENTS

2009/0190163 A1* 7/2009 Sato .............................. 358/1.15
2011/0279859 A1* 11/2011 Hashimoto ................... 358/1.15

FOREIGN PATENT DOCUMENTS

JP         2011-041129 A    2/2011

* cited by examiner

*Primary Examiner* — Saeid Ebrahimi Dehkord
(74) *Attorney, Agent, or Firm* — Marvin A. Motsenbocker; Mots Law, PLLC

(57) ABSTRACT

An image formation apparatus includes: a platen on which to place a document; a scanner unit configured to scan the document placed on the platen; a document detection unit configured to detect the document placed on the platen; an authentication information input unit configured to receive input of a piece of first authentication information; and a control unit configured, when the document detection unit detects the document before use of the image formation is permitted on the basis of the piece of first authentication information received by the authentication information input unit, to cause the scanner unit to start to scan the document in accordance with a predetermined scan condition if the use is permitted on the basis of the piece of first authentication information received by the authentication information input unit.

6 Claims, 4 Drawing Sheets

Fig. 2

| AUTHENTICATION INFORMATION | SCAN CONDITIONS |
|---|---|
| 11112222333 | FUNCTION = NWScan, RESOLUTION = 200 dpi, CHOICE FROM TWO PRINTING MODES = SINGLE-SIDED, DESTINATION = 192.168.1.7 — SCAN INSTRUCTION A |
| 5555666677777 | FUNCTION = Copy, RESOLUTION = 600 dpi, CHOICE FROM TWO PRINTING MODES = TWO-SIDED, NUMBER OF COPIES = 1 COPY — SCAN INSTRUCTION B |
| ... | ... |

IMAGE FORMATION APPARATUS

CROSS REFERENCE TO RELATED APPLICATIONS

This application claims priority based on 35 USC 119 from prior Japanese Patent Application No. 2013-201010 filed on Sep. 27, 2013, entitled "IMAGE FORMATION APPARATUS", the entire contents of which are incorporated herein by reference.

BACKGROUND OF THE INVENTION

1. Field of the Invention

This disclosure relates to an image formation apparatus configured to scan an image on a document.

2. Description of Related Art

A conventional image formation apparatus is designed to take a reservation for its use from an external apparatus connected to it through a network, and to automatically switch to a reserved mode when the image formation apparatus becomes available. The image formation apparatus allows detailed use conditions to be set at the time of the reservation for its use, and can form an image in response to just a simple input without requiring the detailed conditions to be set through its operation section (see Japanese Patent Application Publication No. 2011-41129, for example).

The conventional image formation apparatus is further designed to authenticate a user by reading user identification information for identifying the user from the operation section or a card reader and thereby to permit the use by the authenticated user. For example, in a case where the user intends to duplicate a document by making a reservation on the image formation apparatus for a copy operation of scanning and duplicating the document fed from an automatic document feeder (ADF), the user makes the reservation for its use by inputting user identification information and use conditions through the external apparatus, and then goes to the image formation apparatus. Next, the user places the document in the ADF of the image formation apparatus, then is authenticated by inputting the user identification information, and then duplicates the document by pressing the copy execution start button.

SUMMARY OF THE INVENTION

The conventional technique, however, poses a problem of low user friendliness, since the image formation apparatus requires the user to press the start button although the apparatus is ready to duplicate the document once it completes the user authentication after the user beforehand sets the use conditions by manipulating the external apparatus and places the document in the ADF.

An object of an embodiment of the invention is to enhance the user friendliness.

An aspect of the invention is an image formation apparatus that includes: a platen on which to place a document; a scanner unit configured to scan the document placed on the platen; a document detection unit configured to detect the document placed on the platen; an authentication information input unit configured to receive input of a piece of first authentication information; and a control unit configured, when the document detection unit detects the document before use of the image formation is permitted on the basis of the piece of first authentication information received by the authentication information input unit, to cause the scanner unit to start to scan the document in accordance with a predetermined scan condition if the use is permitted on the basis of the piece of first authentication information received by the authentication information input unit.

According to this aspect of the invention, the user friendliness can be enhanced.

BRIEF DESCRIPTION OF THE DRAWINGS

FIG. 2 is an explanatory diagram of a scan instruction list of the embodiment.

DETAILED DESCRIPTION OF EMBODIMENTS

Figure 1:
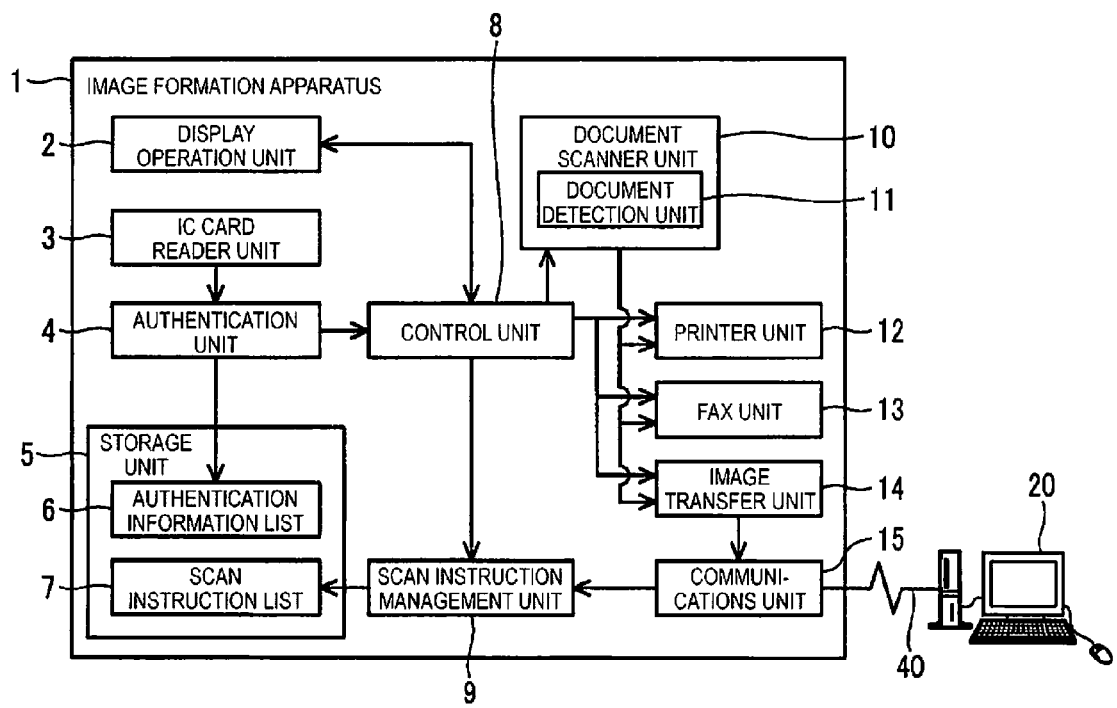
FIG. 1 is a block diagram illustrating a configuration of an image formation apparatus of an embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

Referring to the drawings, descriptions will be provided for an image formation apparatus of an embodiment of the invention.

Embodiment

FIG. 1 is a block diagram illustrating a configuration of the image formation apparatus of the embodiment. In FIG. 1, image formation apparatus 1 is a multifunction peripheral, for example. Image formation apparatus 1 includes display operation unit 2, IC card reader unit 3, authentication unit 4, storage unit 5, control unit 8, scan instruction management unit 9, document scanner unit 10, printer unit 12, FAX unit 13, image transfer unit 14 and communications unit 15. Image formation apparatus 1 is communicably connected to information processor apparatus 20, such as a host computer, through communications line 40.

Display operation unit 2 is a user interface, such as a touch panel, including: an operation section for accepting the user's input; and a display section for displaying screens such as a function selector screen, and a setting changer screen for accepting the user's input for changing scan conditions from default or previously set scan conditions. Display operation unit 2 causes screens, such as the function selector screen and the setting changer screen, to be displayed in the display section, as well as accepts the user's input for setting changes via the operation section, and informs control unit 8 of the setting changes. IC card reader unit 3 or an authentication input unit is an IC card reader in this embodiment. Once an IC card is put on or over the IC card reader, IC card reader unit 3 reads and inputs user identification information, as authentication information (first authentication information), stored in the IC card for identifying the user. The user identification information is information for identifying the user who is authorized to use image formation apparatus 1, and is used as an ID or the like assigned to each person.

Authentication unit 4 compares the authentication information (first authentication information) read by IC card reader unit 3 with pieces of authentication information (second authentication information) which are beforehand stored in authentication information list 6 stored in storage unit 5, and makes a determination whether or not the user is authorized to use image formation apparatus 1. If the authentication information (first authentication information) read by IC card reader unit 3 matches one of the pieces of authentication information (second authentication information) which are beforehand stored in authentication information list 6 stored in storage unit 5, authentication unit 4 determines that the person is successfully authenticated. If there is not a match, authentication unit 4 determines that the person fails to be authenticated. The described embodiment is one in which the authentication is performed to determine if the user is authorized to use image formation apparatus 1. It should be noted, however, that the authentication of whether or not the user is authorized may also be instead performed by an external apparatus such as an authentication server connected to image formation apparatus 1 through the communications line. It should be also noted that two or more different users may use a same user identification information, that is, two or more different users may be registered under a same piece of authentication information (second authentication information) preset in authentication information list 6.

Storage unit 5 is formed from a non-volatile storage medium. Storage unit 5 stores, among other things, various setting information on image formation apparatus 1's operations such as settings for the operation of scanning a document, and for the operation of outputting image data on the scanned document; and threshold values used for image formation apparatus 1's control. In the embodiment, storage unit 5 stores: authentication information list 6 used by authentication unit 4 to authenticate whether or not the user is an authorized person; and scan instruction list 7 for storing a scan instruction which is received from information processor apparatus 20 via communications unit 15. Storage unit 5 further stores a control program (software) for controlling the entire actions of image formation apparatus 1. Document scanner unit 10 includes an ADF (Automatic Document Feeder), and is configured to scan a document placed in a manual feed tray as a platen of the ADF. Document scanner unit 10 scans information printed on the document while conveying the document placed on the ADF, and thereby acquires the information as image data.

Document scanner unit 10 includes document detection unit 11. Document detection unit 11 detects a document placed on the platen. Using a document detection sensor provided to the ADF, document detection unit 11 detects the placement of the document in the ADF manual feed tray, and does so by constantly monitoring the document detection sensor such as a document detection switch configured to detect whether or not the document is placed in the ADF manual feed tray. Document detection unit 11 sends control unit 8 document presence/absence information on whether or not the document is in the ADF manual feed tray. In accordance with an instruction from control unit 8, document scanner unit 10 transfers the acquired image data on the document to printer unit 12, FAX unit 13 and image transfer unit 14.

Printer unit 12 forms an image on a print sheet as a medium on the basis of the image data received from document scanner unit 10. FAX unit 13 faxes the image data received from document scanner unit 10 to another apparatus via a public network. Image transfer unit 14 sends the image data received from document scanner unit 10 to an address specified by control unit 8 via communications unit 15. Communications unit 15 is a communications interface configured to send and receive information to and from an external apparatus and an external terminal via communications lines 40. In the embodiment, communications unit 15 sends scan instruction management unit 9 the scan instruction which is received from information processor apparatus 20 via communications lines 40. Communications unit 15 also sends to information processor unit 20, to the external apparatus, and to the external terminal and the like the image data which is sent from image transfer unit 14.

Control unit 8 contains a CPU (Central Processing Unit) and/or the like, and controls the entire actions of image formation apparatus 1 on the basis of the control program stored in storage unit 5. Based on the scan instruction received from scan instruction management unit 9 and the document presence/absence information received from document detection unit 11, control unit 8 instructs document scanner unit 10 whether or not to start to scan the document. Control unit 8 further causes display operation unit 2 to display a scan setting screen to allow the user to input document scan setting information. In addition, control unit 8 causes printer unit 12, FAX unit 13 and image transfer unit 14 to process the image data on the document acquired by document scanner unit 10. Here, control unit 8 includes a timer as a time measuring device configured to measure the passage of time.

Once requested by control unit 8 to acquire scan conditions on the basis of the authentication information, scan instruction management unit 9 searches scan instruction list 7 for a scan instruction which matches the authentication information. If such a scan instruction is in scan instruction list 7, scan instruction management unit 9 informs control unit 8 of the scan conditions included in the scan instruction, and deletes the scan instruction from scan instruction list 7. On the other hand, if no scan instruction matching the authentication information is in scan instruction list 7, scan instruction management unit 9 informs control unit 8 of the absence of the scan conditions. In addition, scan instruction management unit 9 stores the scan instruction, received from information processor unit 20 via communications unit 15, in scan instruction list 7.

FIG. 2 is an explanatory diagram of a scan instruction list of the embodiment. In FIG. 2, each scan instruction in scan instruction list 7 is formed from authentication information 71 and scan conditions 72. The scan instruction is associated with authentication information 71 and scan conditions 72, and is stored in the scan instruction list. Authentication information 71 is information used to identify the user. Scan conditions 72 are conditions for scanning a document, and include at least the function, resolution and a choice of two printing modes.

Here, referring to FIG. 1, descriptions are provided for the function. The function is an item used to uniquely identify how the image data scanned by document scanner unit 10 needs to be processed. The function includes: a "Copy" function in which printer unit 12 makes a copy on a medium on the basis of the image data scanned by document scanner unit 10; a "NWScan" (NewWork Scan) function in which image transfer unit 14 sends the image data scanned by document scanner unit 10 to a specified destination; and a "ScanToFax" function (not shown) in which Fax unit 13 faxes the image data scanned by the document scanner unit 10 to a specified destination, and the like. In addition, the resolution is an item used to identify resolution (for example, 600 dpi (dots per inch)) with which document scanner unit 10 scans the image. Furthermore, the choice of the two printing modes is an item used to identify a single-sided printing mode in which document scanner unit 10 scans an image from one side of each original or a double-sided printing mode in which document scanner unit 10 scans images from the respective two sides of each original. Scan instruction list 7 is formed from multiple scan instructions including scan instruction A and scan instruction B, for example.

Figure 3:
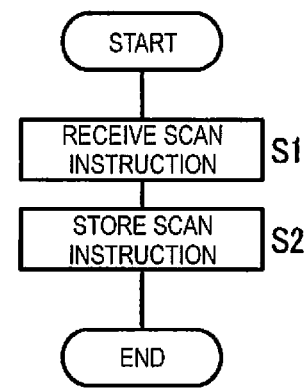
FIG. 3 is a flowchart illustrating a sequence of a scan instruction list storage process of the embodiment.

Descriptions are provided for how the configuration works. First of all, referring to FIG. 1, a scan instruction list storage process for the image formation apparatus to store the scan instruction in the scan instruction list is described by the following steps which are each denoted by a reference sign starting with S in a flowchart in FIG. 3 illustrating the sequence of the scan instruction list storage process of the embodiment.

S1: Communications unit 15 of image formation apparatus 1 receives the scan instruction sent from information processor apparatus 20 via communications line 40.

S2: Communications unit 15 sends the received scan instruction to scan instruction management unit 9. Scan instruction management unit 9 adds the received scan instruction to scan instruction list 7 stored in storage unit 5, then terminates the process. In this manner, the scan instruction including the scan conditions requested by the user is sent from information processor apparatus 20, and is stored in scan instruction list 7 in image formation apparatus 1.

Figure 4:
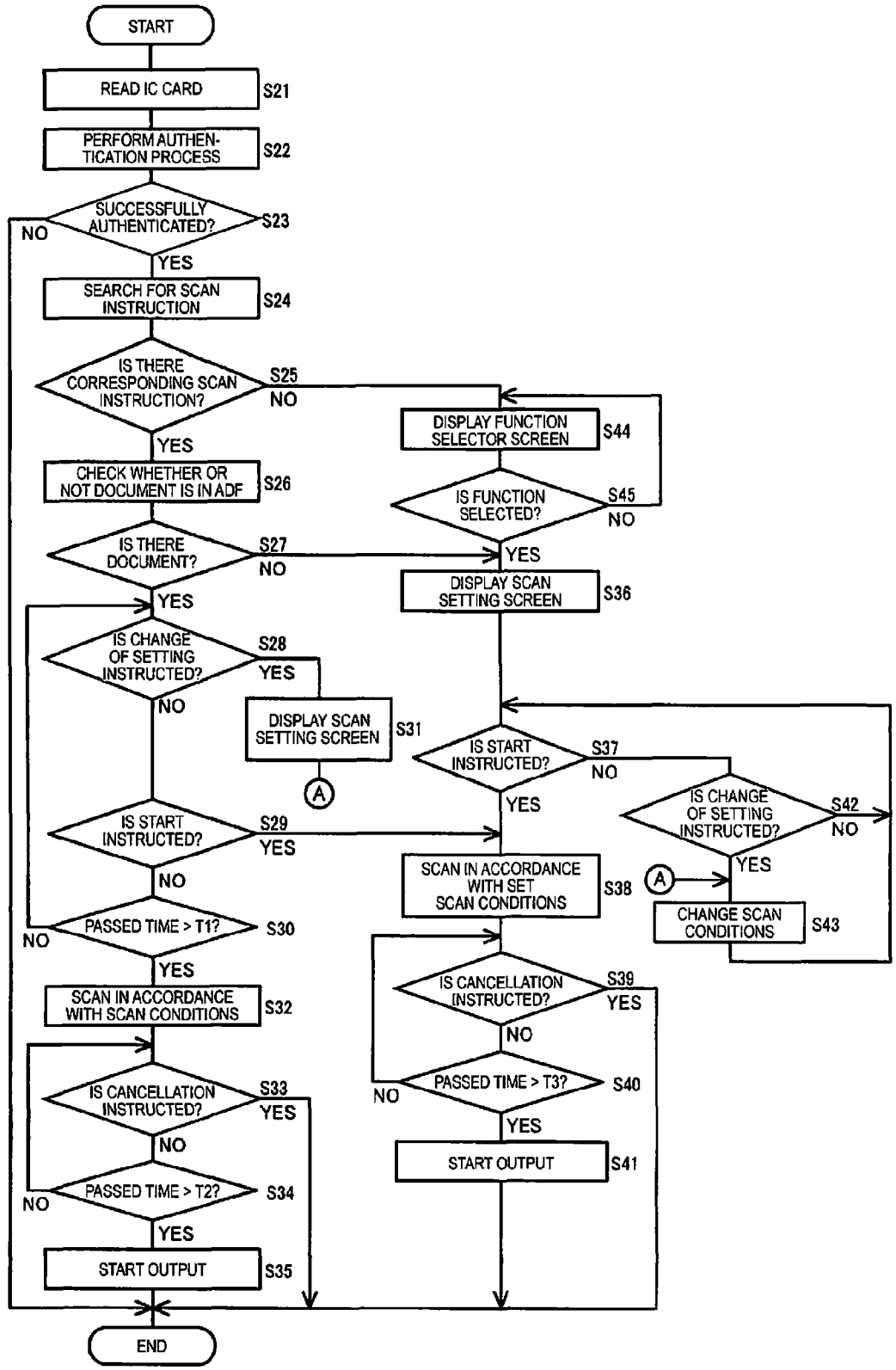
FIG. 4 is a flowchart illustrating a sequence of a scan process of the embodiment.

Next, referring to FIG. 1, a document scan process to be performed by the image formation apparatus is described by the following steps which are each denoted by a reference sign starting with S in a flowchart in FIG. 4 illustrating the sequence of the scan process of the embodiment. It should be noted that the scan process is a process to read the IC card by IC card reader unit 3, then to scan the document by the document scanner unit 10, and to output the image data on the scanned document by printer unit 12, FAX unit 13 or image transfer unit 14.

S21: IC card reader unit 3 of image formation apparatus 1 reads the authentication information from the IC card when the IC card is brought close to IC card reader unit 3.

S22: Once IC card reader unit 3 reads the authentication information from the IC card, authentication unit 4 performs an authentication process of: searching authentication information list 6 on the basis of the authentication information read by the IC card reader unit 3; and judging whether or not authentication information matching the authentication information read by IC card reader unit 3 is in authentication information list 6.

S23: If authentication unit 4 judges that the authentication information matching the authentication information read by IC card reader unit 3 is in authentication information list 6, authentication unit 4 treats the authentication as successful, and the sequence proceeds to S24. If authentication unit 4 judges that no authentication information matching the authentication information read by IC card reader unit 3 is in authentication information list 6, authentication unit 4 treats the authentication as failed, and terminates the process.

S24: Once authentication unit 4 judges that the authentication is successful, authentication unit 4 sends control unit 8 information on the successful authentication together with the authentication information. Upon reception of the information on the successful authentication, control unit 8 requests scan instruction management unit 9 to acquire the scan conditions by specifying the received authentication information. Based on the specified authentication information, scan instruction management unit 9 searches scan instruction list 7, and searches scan instruction list 7 for a scan instruction associated with the authentication information matching the specified authentication information.

S25: Scan instruction management unit 9 judges whether or not there is a scan instruction associated with the authentication information matching the specified authentication information. If scan instruction management unit 9 judges the presence of the scan instruction, scan instruction management unit 9 extracts the scan conditions included in the scan instruction from scan instruction list 7, sends the extracted scan conditions to control unit 8, and the sequence proceeds to S26. On the other hand, if scan instruction management unit 9 judges that there is no scan instruction associated with the authentication information matching the specified authentication information, scan instruction measurement unit 9 sends information on the absence of the scan instruction to control unit 8, and the sequence proceeds to S44. It should be noted that after extracting the scan instruction from scan instruction list 7, scan instruction management unit 9 deletes the extracted scan instruction from scan instruction list 7.

S26: Once control unit 8 acquires the scan conditions from scan instruction management unit 9, control unit 8 asks document detection unit 11 whether or not the document is in the ADF. Using the document detection sensor, document detection unit 11 checks whether or not the document is in the ADF.

S27: If document detection unit 11 judges that the document is in the ADF, document detection unit 11 informs control unit 8 of the presence of the document, and the sequence proceeds to S28. If document detection unit 11 judges that no document is in the ADF, document detection unit 11 informs control unit 8 of the absence of the document, and the sequence proceeds to S36. In this respect, upon reception of the information on the presence of the document in the ADF, control unit 8 starts to measure passage of time.

S28: If display operation unit 2 receives an input on a menu screen or the like for an instruction to change the setting of the scan conditions, the sequence proceeds to S31 in order to display the setting screen (scan conditions). If display operation unit 2 receives no input for the instruction to change the setting of the scan conditions, the sequence proceeds to S29.

S29: If display operation unit 2 receives an input on a start button or the like for an instruction to start scanning, the sequence proceeds to S38 in order to start to scan the document. If display operation unit 2 receives no input for the instruction to start scanning, the sequence proceeds to S30.

S30: Control unit 8 judges whether or not time passed since the reception of the information of the presence of the document in the ADF in S27 exceeds a scan condition change margin time T1 as first predetermined time. If control unit 8 judges that the passed time exceeds the scan condition change margin time T1, the sequence proceeds to S32 in order to start to scan the document. If control unit 8 judges that the passed time does not exceed the scan condition change margin time T1, the sequence proceeds to S28 in order to monitor the input for the instruction to change the setting of the scan conditions and the input, such as the pressing of the start button, for the instruction to start scanning.

As described above, before document scanner unit 10 starts to scan the document, control unit 8 receives the input on display operation unit 2 for changing the scan conditions until scan condition change margin time T1 as the first predetermined time passes since the input of the authentication information by IC card reader unit 3 and the detection of the document by document detection unit 11. It should be noted that the scan condition change margin time T1 can be changed using the setting screen displayed on display operation unit 2, and is stored in storage unit 5.

S31: Once display operation unit 2 receives the input for the instruction to change the setting of the scan conditions, control unit 8 informs display operation unit 2 of an instruction to display a scan setting screen in accordance with the scan conditions acquired from scan instruction management unit 9. Display operation unit 2 displays the scan setting screen on the display section in accordance with the received instruction, and the sequence proceeds to S43. For example, in a case where scanning conditions included in scan instruction A illustrated in FIG. 2 are displayed on the scan setting screen, items "Function=NWScan," "Resolution=200 dpi," "Choice from two printing modes=Single-sided," and "Destination=192.168.1.7 (IP address)" are displayed there.

S32 Control unit 8 informs document scanner unit 10 of an instruction to start to scan the document in accordance with the scan conditions which are included in the scan instruction extracted from scan instruction list 7. Upon reception of the instruction to start to scan the document, document scanner unit 10 starts to scan the document in accordance with the scan conditions. In this respect, simultaneously with informing document scanner unit 10 of the instruction to scan the document, control unit 8 starts to measure the passage of time. In this manner, when the authentication information is inputted by IC card reader unit 3, control unit 8 causes document scanner unit 10 to start to scan the document in accordance with scan conditions 72, which are included in the scan instruction extracted on the basis of the authentication information, without receiving the input for the instruction to start scanning if the authentication information is in the authentication information list 6 in storage unit 5 and the document is detected by document detection unit 11 in document scanner unit 10.

S33: If display operation unit 2 receives an input for an instruction to cancel the output of the received document image, display operation unit 2 cancels the output of the document image, and terminates the process. If display operation unit 2 receives no input for the instruction to cancel the output, the sequence proceeds to S34.

S34: Control unit 8 judges whether or not the time passed since the start of the document scanning in S32 exceeds output cancellation margin time T2 as a second predetermined time. If control unit 8 judges that the passed time exceeds output cancellation margin time T2, the sequence proceeds to S35 in order to output the scanned document image. If control unit judges that the passed time does not exceed output cancellation margin time T2, the sequence proceeds to S33 in order to monitor the input for cancelling the output of the scanned document image.

S35: Once document scanner unit 10 completes scanning the document, control unit 8 causes document scanner unit 10 to output the image data on the document, which is acquired by document scanner unit 10 in accordance with the scan conditions, to printer unit 12, FAX unit 13 or image transfer unit 14, and terminates the process.

S36: On the other hand, once control unit 8 is informed of the information on the absence of the document in the ADF in S27, control unit 8 informs display operation unit 2 of an instruction to display a scan setting screen in accordance with the scan conditions acquired from scan instruction management unit 9. Display operation unit 2 displays the scan setting screen on the display section in accordance with the received instruction. The scan setting screen is the same as the scan setting screen displayed in S31.

S37: If display operation unit 2 receives an input for an instruction to start scanning, the sequence proceeds to S38 in order to start to scan the document. If display operation unit 2 receives no instruction to start scanning, the sequence proceeds to S42.

S38: Once display operation unit 2 receives a press of a scan start instruction button, control unit 8 informs document scanner unit 10 of an instruction to start to scan the document in accordance with the changed scan conditions set through the scan operation screen. Upon reception of the instruction to start to scan the document, document scanner unit 10 starts to scan the document in accordance with the scan conditions. In this respect, simultaneously with informing document scanner unit 10 of the instruction to start to scan the document, control unit 8 starts to measure the passage of time.

S39: If display operation unit 2 receives the instruction to cancel the output of the scanned document image, display operation unit 2 cancels the output of the document image, and terminates the process. If display operation unit 2 receives no instruction to cancel the output, the sequence proceeds to S40.

S40: Control unit 8 judges whether or not the time passed since the start of the document scanning in S38 exceeds output suspension margin time T3 as a third predetermined time. If control unit 8 judges that the passed time exceeds output suspension margin time T3, the sequence proceeds to S41 in order to output the scanned document image. If control unit 8 judges that the passed time does not exceed the output suspension margin time T3, the sequence proceeds to S39 in order to monitor the input for cancelling the output of the scanned document image. It should be noted that output suspension margin times T2, T3 can be changed through the setting screen displayed on display operation unit 2, and are stored in storage unit 5.

In the embodiment, output suspension margin times T2, T3 are set at, for example, 5 seconds and 2 seconds, respectively. Output suspension margin time T2 is set longer than output suspension margin time T3, and is beforehand stored in storage unit 5. Their initial values have a relationship of output suspension margin time T3<output suspension margin time T2.

S41: Once document scanner unit 10 completes scanning the document, control unit 8 causes document scanner unit 10 to output the image data on the document, acquired by the document scanner unit 10 in accordance with the scan conditions, to printer unit 12, FAX unit 13 or image transfer unit 14, and terminates the process.

S42: On the other hand, if the scan start instruction button is not pressed in S37, and if display operation unit 2 receives the input for the instruction to change the setting of the scan conditions, the sequence proceeds to S43 in order to change the scan conditions. If display operation unit 2 receives no input for the instruction to change the setting of the scan conditions, the sequence proceeds to S37, where display operation unit 2 keeps on displaying the scan setting screen. In this manner, control unit 8 causes display operation unit 2 to display the setting change screen, and to receive the input for changing the scan conditions, if, when the authentication information is inputted by IC card reader unit 3, the authentication information is in authentication information list 6 in storage unit 5, and no document is detected by document detection unit 11 in document scanner unit 10.

S43: Upon reception of the input for the instruction to change the setting of the scan conditions, display operation unit 2 informs control unit 8 of the contents of the change in the scan conditions received through the setting change screen, and control unit 8 thereby changes the setting of the scan conditions in accordance with the received contents of the change in the scan conditions. Control unit 8 causes display operation unit 2 to display a scan setting screen in accordance with the changed scan conditions, and the sequence proceeds to S37.

S44: Upon reception of the information on the absence of the scan instruction associated with the authentication information which matches the authentication information specified by scan instruction management unit 9 in S25, control unit 8 causes display operation unit 2 to display the function selector screen for receiving an input for selecting functions such as the NWScan function, the Copy function and the ScanToFax function.

S45: If a function is selected on the function selector screen, display operation unit 2 informs control unit 8 of the selected function, and the sequence proceeds to S36, where control unit 8 causes display unit 2 to display a scan setting screen corresponding to the selected function. The scan conditions at this time are formed from initial values, and the scan conditions on the scan setting screen are represented by the initial values. On the other hand, if no function is selected on the function selector screen, the sequence proceeds to S44, where display operation unit 2 keeps on displaying the function selector screen.

As described above, in image formation apparatus 1 of the embodiment, control unit 8 automatically starts the operation of scanning the document in a case where: the authentication information is inputted by IC card reader unit 3; the user is successfully authenticated by authentication unit 4 to be an authorized person; and document detection unit 11 in document scanner unit 10 detects the document to be placed in the ADF document tray. For this reason, the user is no longer required to input the instruction to start scanning. Accordingly, the operation load on the user can be reduced, and the operability can be enhanced for the user. Furthermore, control unit 8 enables the setting of the scan conditions to be changed through display operation unit 2 by suspending the automatic start of the operation of scanning the document in a case where the user inputs the authentication information through IC card reader unit 3 and is successfully authenticated by authentication unit 4; and document detection unit 11 in document scanner unit 10 detects no document being placed in the ADF document tray.

It should be noted that messages such as "Document scanning starts based on preset condition when authentication is completed with document set in ADF document tray" may be displayed on display operation unit 2 before image formation unit 1 starts the process of scanning the document. As described above, the embodiment brings about an effect that: the user is no longer required to input the instruction to start scanning; operation load on the user is reduced; and operability is enhanced for the user, since the operation of scanning the document automatically starts with the input of the authentication information, the successful user authentication, and the detection of the document in the ADF document tray.

The embodiment further brings about an effect of the enhancement of the operability for the user since the setting of the scan conditions can be changed by suspending the automatic start of the operation of scanning the document on conditions of: the input of the authentication information, the successful user authentication, and the detection of no document in the ADF document tray. The foregoing descriptions are provided for the embodiment in which the image formation apparatus is a multifunction peripheral. It should be noted, however, that: the embodiment is not limited to this; and the image formation apparatus may be a scanner machine, a facsimile machine and the like as long as they are equipped with a document scanner unit.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image formation apparatus comprising:
   a platen on which to place a document;
   a scanner unit configured to scan the document placed on the platen;
   a document detection unit configured to detect the document placed on the platen;
   an authentication information input unit configured to receive input of a piece of first authentication information; and
   a control unit configured, when the document detection unit detects the document before use of the image formation is permitted on the basis of the piece of first authentication information received by the authentication information input unit, to cause the scanner unit to start to scan the document in accordance with a predetermined scan condition if the use is permitted on the basis of the piece of first authentication information received by the authentication information input unit; and
   a storage unit configured to store:
      pieces of second authentication information preset respectively for users for user identification, and
      scan conditions preset respectively for the pieces of second authentication information,
   wherein, when the authentication information input unit receives the piece of first authentication information and one of the pieces of second authentication information stored in the storage unit corresponds to the piece of first authentication information and the document detection unit detects if any document is on the platen and a predetermined time has elapsed after the document detection unit detects the document, the control unit causes the scanner unit to automatically start to scan the document without any further input by the user associated with the piece of first authentication information in accordance with the scan condition preset for the piece of second authentication.

2. The image formation apparatus according to claim 1, further comprising an operation unit configured to receive an input by a user,
   wherein, when the authentication information input unit receives the piece of first authentication information and when one of the pieces of second authentication information stored in the storage unit corresponds to the piece of first authentication information and the document detection unit detects no document, the control unit causes the scanner unit to suspend starting to scan the document, and causes the operation unit to receive an input for changing the scan condition within a predetermined time after when the piece of first authentication information is received, and
   wherein, in a case when the operation unit does not receive the input for changing the scan condition within the predetermined time, the process to start the scan of the document is automatically canceled.

3. The image formation apparatus according to claim 1, further comprising:
   an operation unit configured to receive an input by a user; and
   a display unit configured to display a setting change screen for receiving an input for changing the scan condition,
   wherein, when the authentication information input unit receives the piece of first authentication information and one of the pieces of second authentication information stored in the storage unit corresponds to the piece of first authentication information and then the document detection unit detects no document, the control unit causes the display unit to display the setting change screen; and wherein, when a user input of an instruction to start scanning via the operation unit is received after a user input of changing the scan condition via the operation unit is received, the control unit causes the scanner unit to start to scan the document in accordance with the changed scan condition.

4. The image formation apparatus according to claim 1, further comprising an operation unit configured to receive an input by a user, wherein, before the scanner unit starts to scan the document, the control unit causes the operation unit to receive an input for changing the scan condition until a first predetermined time is passed since the authentication information input unit inputs the piece of first authentication information and the document detection unit detects the document.

5. An image forming apparatus comprising:

a platen on which to place a document;

a scanner unit configured to scan the document placed on the platen;

a document detection unit configured to detect the document placed on the platen;

an authentication information input unit configured to receive input of a piece of first authentication information;

a control unit configured, when the document detection unit detects the document before use of the image formation is permitted on the basis of the piece of first authentication information received by the authentication information input unit, to cause the scanner unit to start to scan the document in accordance with a predetermined scan condition if the use is permitted on the basis of the piece of first authentication information received by the authentication information input unit;

a storage unit configured to store:
  pieces of second authentication information preset respectively for users for user identification, and
  scan conditions preset respectively for the pieces of second authentication information, wherein, when the authentication information input unit receives the piece of first authentication information and when one of the pieces of second authentication information stored in the storage unit corresponds to the piece of first authentication information and the document detection unit detects the document, the control unit causes the scanner unit to start to scan the document in accordance with the scan condition preset for the piece of second authentication information corresponding to the piece of first authentication information; and an operation unit configured to receive an input by a user;

wherein, when the authentication information input unit receives the piece of first authentication information and when one of the pieces of second authentication information stored in the storage unit corresponds to the piece of first authentication information and the document detection unit detects no document, the control unit causes the scanner unit to suspend starting to scan the document, and causes the operation unit to receive an input for changing the scan condition, wherein, when input of an instruction to start scanning is received after the scan conditions are changed, the control unit causes the scanner unit to start to scan the document in accordance the changed scan condition, when the authentication information input unit inputs the piece of first authentication information and when one of the pieces of second authentication information stored in the storage unit corresponds to the piece of first authentication information and the document detection unit detects the document, the control unit causes the operation unit to receive an input for cancelling an output of an image of the document scanned by the scanner unit until a second predetermined time is passed since the scanner unit starts to scan the document, and when the authentication information input unit inputs the piece of first authentication information and when one of the pieces of second authentication information stored in the storage unit corresponds to the piece of first authentication information and the document detection unit detects no document, the control unit causes the operation unit to receive the input for cancelling the output of the image of the document scanned by the scanner unit until a third predetermined time is passed since the scanner unit starts to scan the document.

6. The image formation apparatus according to claim 5, wherein the second predetermined time is longer than the third predetermined time.

* * * * *